US009602219B2

(12) United States Patent
Sun et al.

(10) Patent No.: US 9,602,219 B2
(45) Date of Patent: Mar. 21, 2017

(54) EFFICIENT PROCESSING OF HIGH DATA RATE SIGNALS WITH A CONFIGURABLE FREQUENCY DOMAIN EQUALIZER

(71) Applicant: Infinera Corporation, Sunnyvale, CA (US)

(72) Inventors: Han H. Sun, Ottawa (CA); Yuejian Wu, Woodlawn (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/590,153

(22) Filed: Jan. 6, 2015

(65) Prior Publication Data

US 2016/0197681 A1    Jul. 7, 2016

(51) Int. Cl.
*H04B 10/61*    (2013.01)
*H04J 14/02*    (2006.01)

(52) U.S. Cl.
CPC ..... *H04B 10/6161* (2013.01); *H04B 10/6162* (2013.01); *H04J 14/02* (2013.01)

(58) Field of Classification Search
CPC ............ H04B 10/2513; H04B 10/2569; H04B 10/5053; H04B 10/516; H04B 10/6161–10/6162; H04B 2210/252–2210/254
See application file for complete search history.

(56) References Cited

U.S. PATENT DOCUMENTS

| 7,701,842 | B2 | 4/2010 | Roberts et al. | |
| 2002/0039211 | A1* | 4/2002 | Shen | B82Y 15/00 398/9 |
| 2010/0272446 | A1* | 10/2010 | Harley | H04B 10/5053 398/184 |
| 2010/0329683 | A1* | 12/2010 | Liu | H04B 10/2513 398/81 |
| 2011/0002689 | A1* | 1/2011 | Sano | H04B 10/69 398/44 |
| 2011/0176815 | A1* | 7/2011 | Frankel | H04B 10/5053 398/184 |
| 2014/0205286 | A1* | 7/2014 | Ji | H04B 10/40 398/45 |
| 2015/0086204 | A1* | 3/2015 | Kaneda | H04J 14/0298 398/65 |

OTHER PUBLICATIONS

John J. Shynk, "Frequency-Domain and Multirate Adaptive Filtering", IEEE Signal Processing Magazine (ISSN 1053-5888), vol. 9, Jan. 1992, pp. 14-37.

(Continued)

*Primary Examiner* — David Payne
*Assistant Examiner* — Casey Kretzer
(74) *Attorney, Agent, or Firm* — Harrity & Harrity LLP; David L. Soltz

(57) ABSTRACT

An optical system includes an optical transmitter configured to modulate an optical signal to carry data, associated with an optical channel, via multiple sub-carriers in a quantity greater than four. The optical system further includes an optical receiver configured to demodulate the optical signal to recover the data from the multiple sub-carriers.

4 Claims, 12 Drawing Sheets

(56) References Cited

OTHER PUBLICATIONS

FOA, "Guide to Fiber Optics & Premises Cabling", The Fiber Optic Association, Inc., http://www.thefoa.org/tech/ref/testing/test/CD_PMD.html, Feb. 2010, 7 pages.

Co-pending U.S. Appl. No. 14/231,418, entitled "Configurable Frequency Domain Equalizer for Dispersion Compensation of Multiple Sub-Carriers", by Han H. Sun et al., filed Mar. 31, 2014, 72 pages.

\* cited by examiner

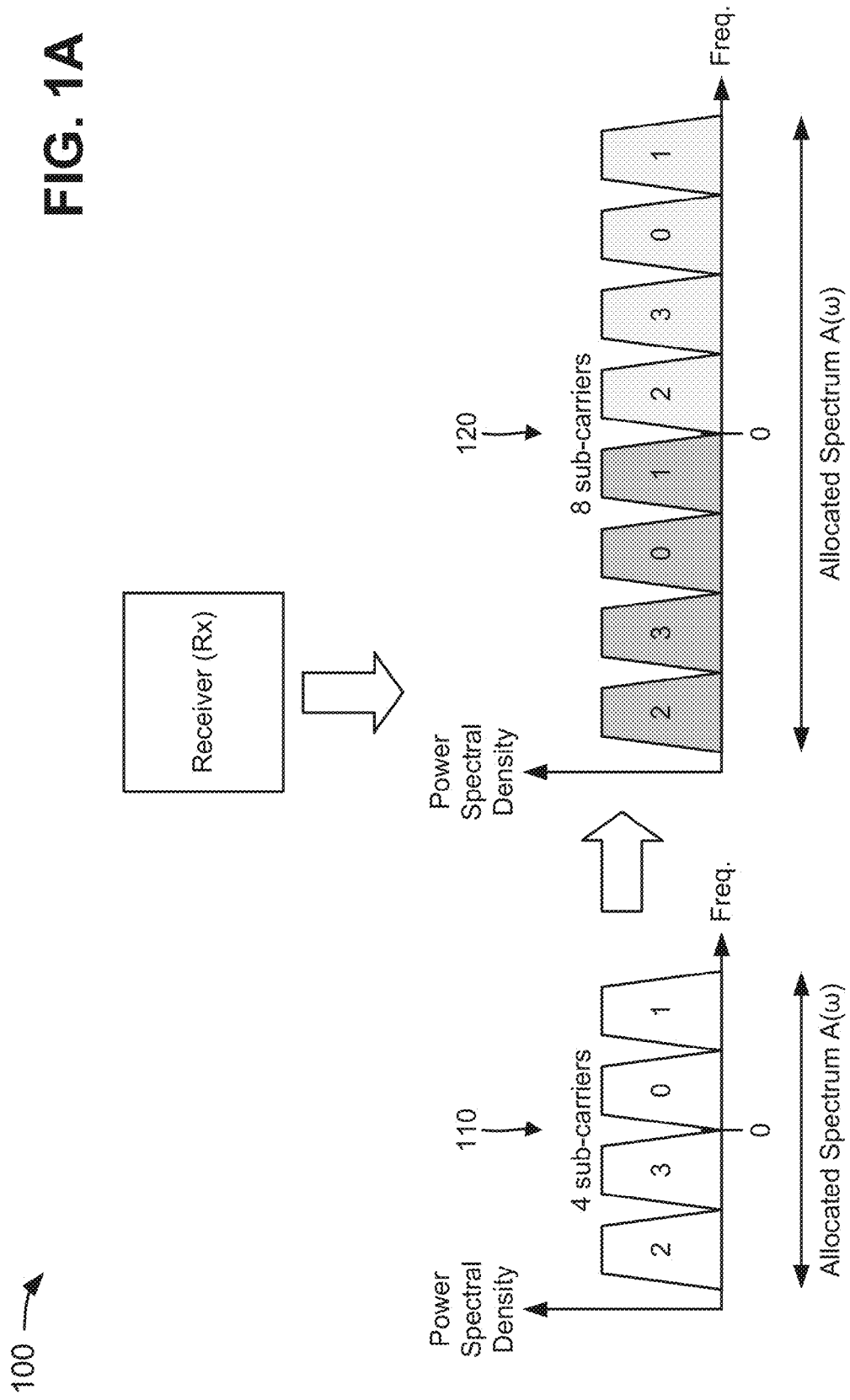

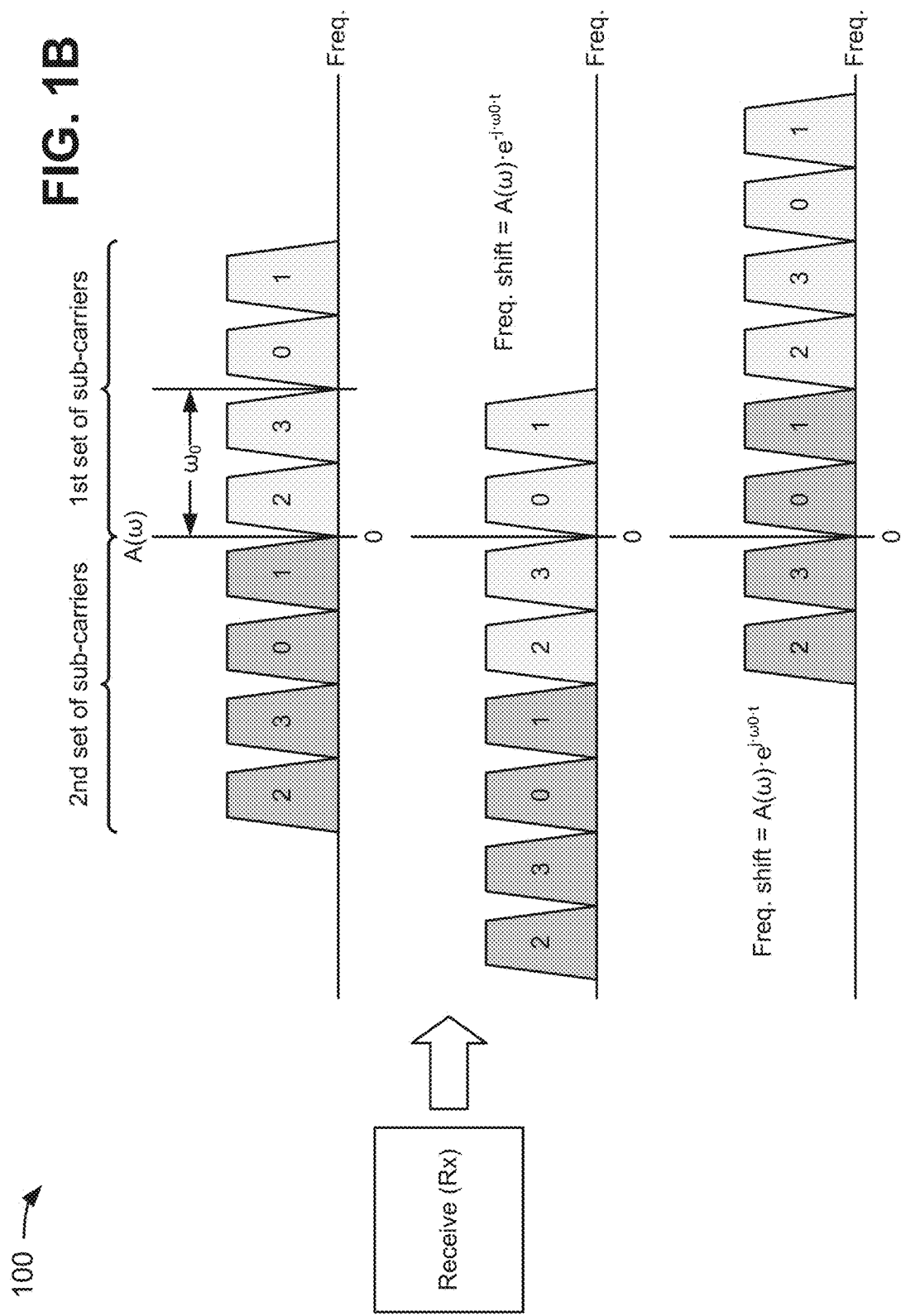

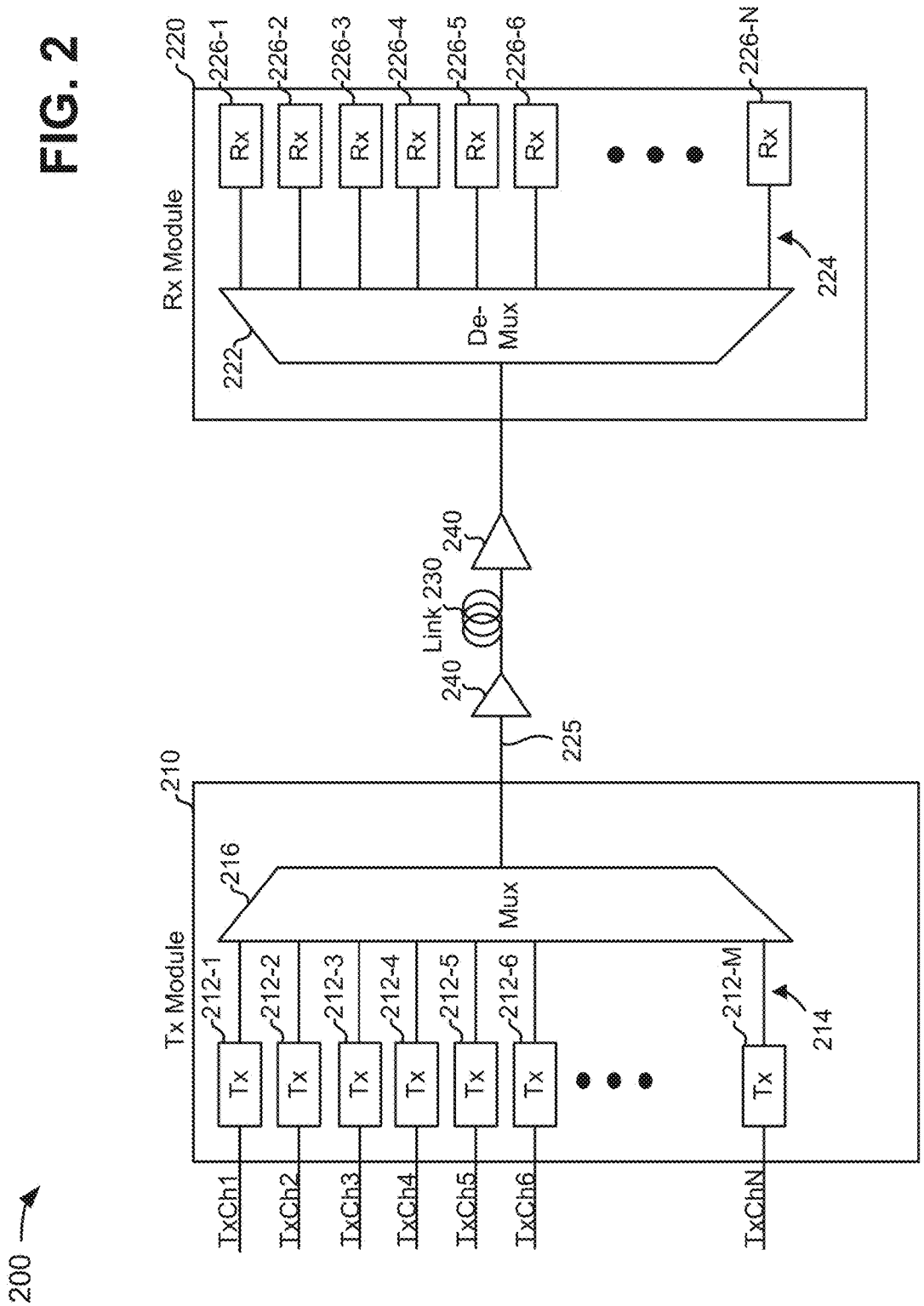

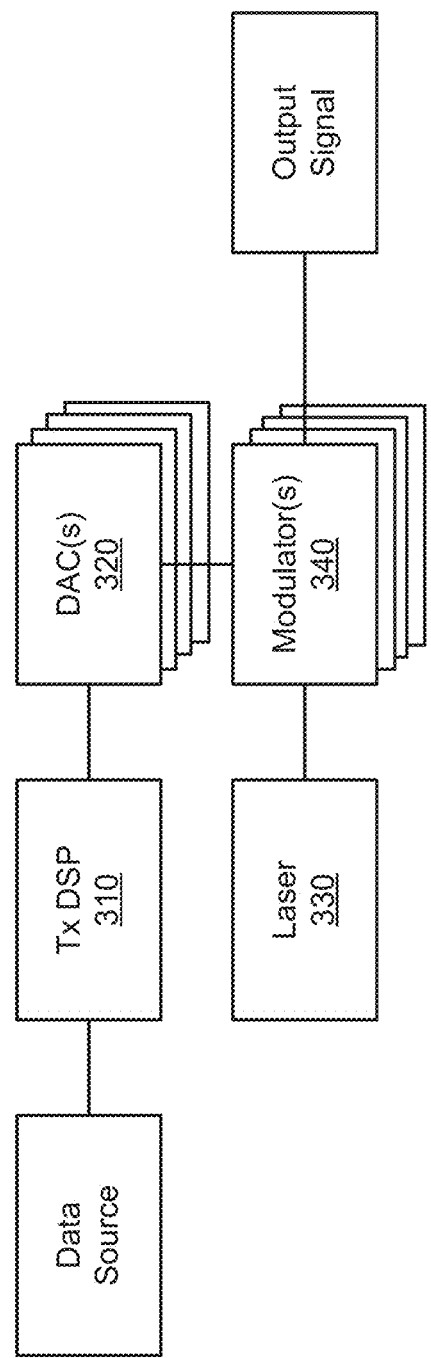

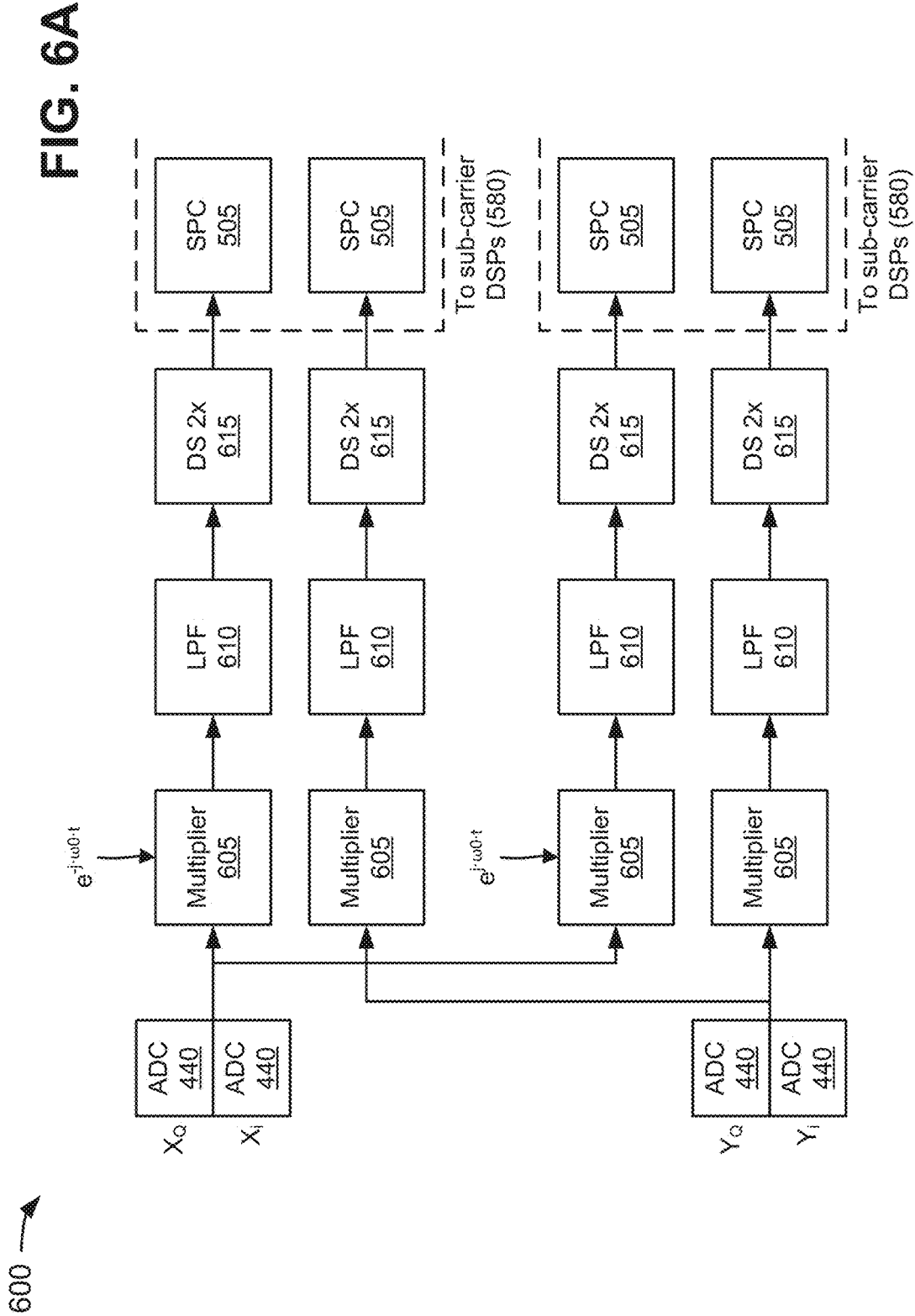

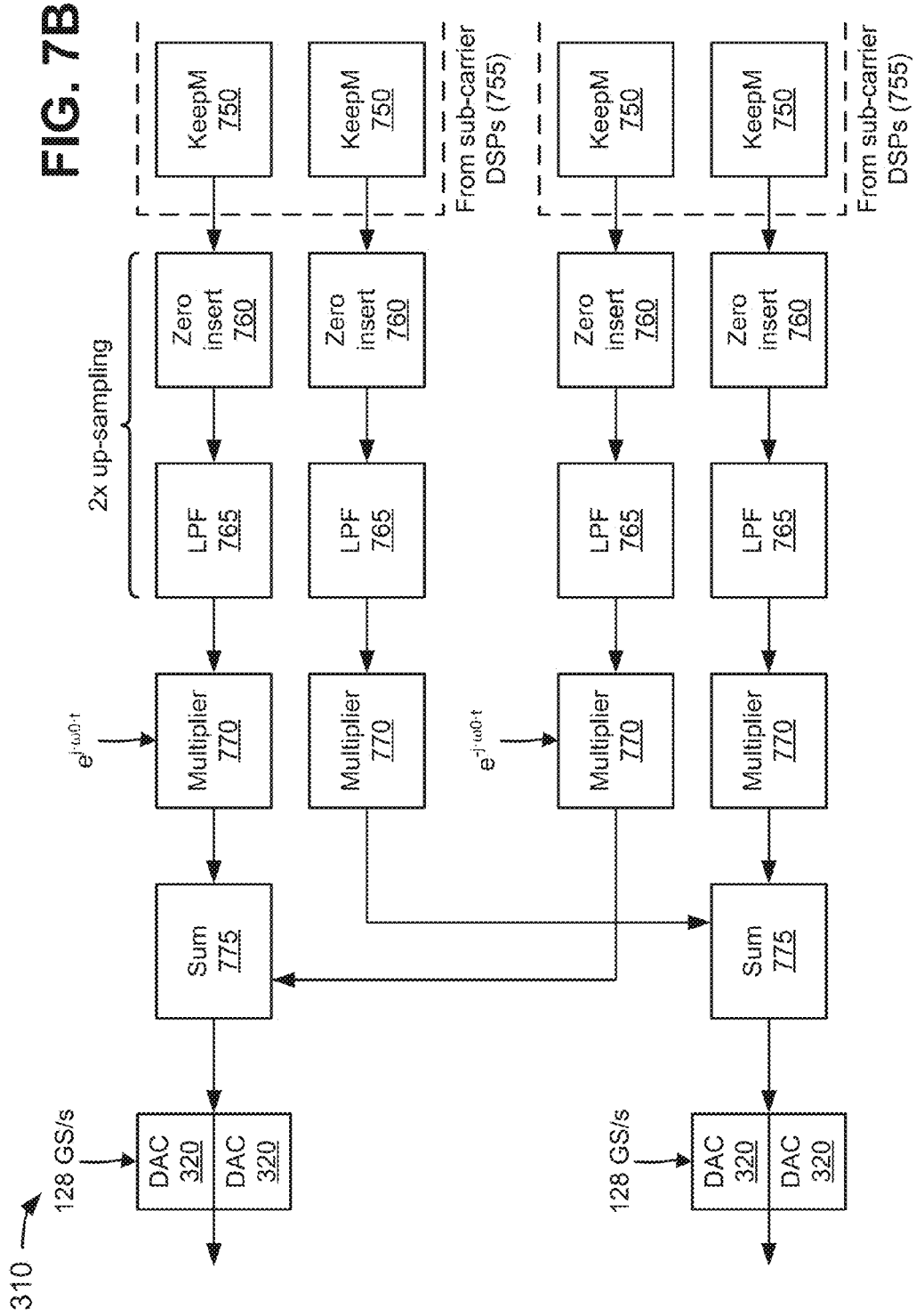

EFFICIENT PROCESSING OF HIGH DATA RATE SIGNALS WITH A CONFIGURABLE FREQUENCY DOMAIN EQUALIZER

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit, such as a receiver (Rx) PIC having an optical demultiplexer circuit (referred to as a "demultiplexer") configured to receive the combined output and demultiplex the combined output into individual optical signals, and receiver components to convert the optical signals into electrical signals, and output the data carried by those electrical signals. Digital optical transmission systems may employ coherent detection to compensate for chromatic dispersion (CD) and polarization mode dispersion (PMD) distortions native in an optical fiber, allowing the use of more complex modulations to increase spectral efficiency and fiber capacity.

SUMMARY

According to some possible implementations, an optical receiver may include a first set of components configured to operate upon a first set of sub-carriers, associated with an optical channel, to compensate for chromatic dispersion and/or polarization mode dispersion that occurs when transmitting an optical signal associated with the optical channel. The optical receiver may include a second set of components configured to operate upon a second set of sub-carriers, associated with the optical channel, to compensate for chromatic dispersion and/or polarization mode dispersion that occurs when transmitting the optical signal associated with the optical channel. The optical channel may include multiple sub-carriers that include the first set of sub-carriers and the second set of sub-carriers, and the multiple sub-carriers are greater than four.

According to some possible implementations, an optical transmitter may include a first set of components configured to modulate an optical signal to carry data, associated with an optical channel, via a first set of sub-carriers, and operate upon the first set of sub-carriers, associated with the optical channel, to compensate for chromatic dispersion and/or polarization mode dispersion that occurs when transmitting the optical signal. The optical transmitter may include a second set of components configured to modulate the optical signal to carry data, associated with the optical channel, via a second set of sub-carriers, and operate upon the second set of sub-carriers, associated with the optical channel, to compensate for chromatic dispersion and/or polarization mode dispersion that occurs when transmitting the optical signal. The optical channel may include multiple sub-carriers that includes the first set of sub-carriers and the second set of sub-carriers, and a quantity of the multiple sub-carriers is greater than four.

According to some possible implementations, an optical system may include an optical transmitter configured to modulate an optical signal to carry data, associated with an optical channel, via multiple sub-carriers. A quantity of the multiple sub-carriers is greater than four. The optical system may further include an optical receiver configured to demodulate the optical signal to recover the data from the multiple sub-carriers.

BRIEF DESCRIPTION OF THE DRAWINGS

FIGS. 1A and 1B are diagrams of an overview of an example implementation described herein;

FIG. 2 is a diagram of an example network in which systems and/or methods, described herein, may be implemented;

FIG. 3 is a diagram of example components of an optical transmitter shown in FIG. 2;

FIGS. 6A-6C are diagrams of example implementations relating to operations performed by components of the Rx digital signal processor shown in FIG. 5; and FIGS. 7A-7C are diagrams of example components of a transmitter digital signal processor shown in FIG. 3.

DETAILED DESCRIPTION

Figure 4:
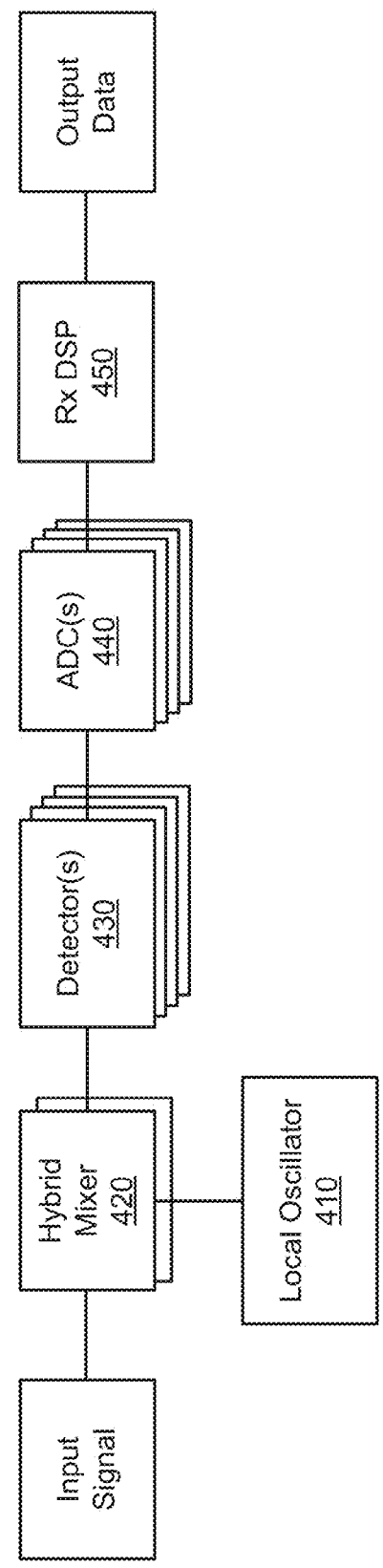
FIG. 4 is a diagram of example components of a transmitter controller shown in FIG. 2.

The following detailed description of example implementations refers to the accompanying drawings. The same reference numbers in different drawings may identify the same or similar elements.

In a WDM system, a transmitter may modulate a signal in order to convey data, via the signal, to a receiver where the signal may be demodulated to recover the data included in the signal. When the signal is transmitted over a link, errors may be introduced into the signal via chromatic dispersion and/or polarization mode dispersion. Chromatic dispersion may be introduced into the signal due to light at different wavelengths being transmitted via the link at different speeds, causing dispersion of the signal. Polarization mode dispersion may be introduced into the signal due to light at different polarizations being transmitted via the link at different speeds, causing further dispersion of the signal. The error in a signal caused by chromatic dispersion and/or polarization mode dispersion may be compensated (e.g., corrected for proper decoding) by the receiver, thus permitting the receiver to properly decode a received signal. Furthermore, the WDM system may handle a particular data rate (e.g., 100 gigabits (Gb)) per optical signal with a particular number of sub-carriers (e.g., four sub-carriers). Each sub-carrier may include a particular symbol rate (e.g., 8 gigabaud (Gbaud)), and four sub-carriers may provide a composite symbol rate of 32 Gbaud (e.g., 4×8=32).

Systems and/or methods, described herein, may use more than four sub-carriers (e.g., eight sub-carriers), and may compensate for dispersion when more than four sub-carriers are used to transmit optical signals, which may be more computationally efficient than compensating for dispersion when a single carrier is used to transmit optical signals. The systems and/or methods may handle a data rate per optical signal (e.g., of 200 Gb) that is greater than the data rates per optical signal handled by existing WDM systems. Thus, the systems and/or methods may provide a composite symbol rate (e.g., of 64 Gbaud, 8×8=64) that is greater than the composite symbol rate provided by existing WDM systems.

FIGS. 1A and 1B are diagrams of an overview of an example implementation 100 described herein. As shown in FIG. 1A, in an optical communication system, a certain bandwidth, or spectrum, may be allocated to an optical communication channel. The optical communication system may include a receiver (Rx) that receives the optical communication channel. As shown by reference number 110, the optical channel may include four sub-carriers that carry data via the optical channel. However, with four sub-carriers, the receiver may be capable of handling 100 Gb of data per optical signal and may provide a composite symbol rate of 32 Gbaud. In order to double the data rate handled by and the composite symbol rate provided by the receiver, the optical channel may include eight sub-carriers that carry data via the optical channel, as indicated by reference number 120. By using multiple sub-carriers, a transmitter and the receiver of the optical communication system may use a single laser centered at a center of the overall signal spectrum. Furthermore, by using multiple sub-carriers, the optical communication system may save power associated with dispersion compensation, and may achieve better performance with respect to linewidth and dispersion convolved noise associated with the laser.

As shown in FIG. 1B, the receiver may be modified to accommodate a 64 Gbaud optical signal that includes eight sub-carriers. Each sub-carrier may occupy one eighth of the overall signal bandwidth, and may include a symbol rate of 8 Gbaud. As further shown, two sub-carriers may represent a radian frequency ($\omega_0$) of the optical signal, and the receiver may divide the eight sub-carriers into a first set of four sub-carriers and a second set of four sub-carriers. The receiver may demodulate the first set of four sub-carriers by applying a first multiplier (e.g., $e^{-j-\omega_0-t}$) to the first set of four sub-carriers. The first multiplier may frequency shift, and center at zero, the first set of four sub-carriers. In the above expression, e may represent Euler's number, j may represent an imaginary operator, $\omega_0$ may represent a radian frequency, and t may represent time.

As further shown in FIG. 1B, the receiver may demodulate the second set of four sub-carriers by applying a second multiplier (e.g., $e^{-j-\omega_0-t}$) to the second set of four sub-carriers. The second multiplier may frequency shift, and center at zero, the second set of four sub-carriers. The receiver may filter and downsample the demodulated first set of four sub-carriers, and may provide the filtered and downsampled signal to a first receiver digital signal processor (DSP) of the receiver. The receiver may filter and downsample the demodulated second set of four sub-carriers, and may provide the filtered and downsampled signal to a second receiver DSP of the receiver. The first receiver DSP and the second receiver DSP may process the filtered and downsampled signals. For example, the first receiver DSP and the second receiver DSP may demultiplex the signals according to the sub-carriers, may independently process the signals for each of the sub-carriers, may map the processed signals to produce output data, and may output the output data.

By utilizing eight sub-carriers, the systems and/or methods, described herein, may handle data rates (e.g., 200 Gb) that are greater than data rates handled by existing WDM systems, and may provide a composite symbol rate (e.g., 64 Gbaud) that is greater than the composite symbol rate provided by existing WDM systems.

FIG. 2 is a diagram of an example network 200 in which systems and/or methods, described herein, may be implemented. As shown in FIG. 2, network 200 may include a transmitter (Tx) module 210 (e.g., a Tx PIC), and/or a receiver (Rx) module 220 (e.g., a Rx PIC). In some implementations, transmitter module 210 may be optically connected to receiver module 220 via a link 230. Additionally, link 230 may include one or more optical amplifiers 240 that amplify an optical signal as the optical signal is transmitted over link 230.

Transmitter module 210 may include one or more optical transmitters 212-1 through 212-M (M>1), one or more waveguides 214, and/or an optical multiplexer 216. In some implementations, transmitter module 210 may include additional components, fewer components, different components, or differently arranged components than those shown in FIG. 2.

Optical transmitter 212 may receive data for a data channel (shown as TxCh1 through TxChM), may create multiple sub-carriers for the data channel, may map data, for the data channel, to the multiple sub-carriers, may modulate the data with an optical signal to create a multiple sub-carrier output optical signal, and may transmit the multiple sub-carrier output optical signal. Optical transmitter 212 may be tuned to use an optical carrier of a designated wavelength. In some implementations, the grid of wavelengths emitted by optical transmitters 212 may conform to a known standard, such as a standard published by the Telecommunication Standardization Sector (ITU-T). Additionally, or alternatively, the grid of wavelengths may be flexible and tightly packed to create a super channel.

Waveguide 214 may include an optical link or some other link to transmit output optical signals of optical transmitter 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other type of multiplexer device. In some implementations, optical multiplexer 216 may combine multiple output optical signals, associated with optical transmitters 212, into a single optical signal (e.g., a WDM signal). For example, optical multiplexer 216 may include an input (e.g., a first slab to receive input optical signals supplied by optical transmitters 212) and an output (e.g., a second slab to supply a single WDM signal associated with the input optical signals). Additionally, optical multiplexer 216 may include waveguides connected to the input and the output. In some implementations, optical multiplexer 216 may combine multiple output optical signals, associated with optical transmitters 212, in such a way as to produce a polarization diverse signal (e.g., also referred to herein as a WDM signal). As shown in FIG. 2, optical multiplexer 216 may provide the WDM signal to receiver module 220 via an optical fiber, such as link 230.

Optical multiplexer 216 may receive output optical signals outputted by optical transmitters 212, and may output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier, a Raman amplifier, or the like. Amplifier 240 may amplify the optical signals as the optical signals are transmitted via link 230.

Receiver module 220 may include an optical demultiplexer 222, one or more waveguides 224, and/or one or more optical receivers 226-1 through 226-N (N>1). In some implementations, receiver module 220 may include additional components, fewer components, different components, or differently arranged components than those shown in FIG. 2.

Optical demultiplexer 222 may include an AWG or some other type of demultiplexer device. In some implementations, optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal).

Additionally, optical demultiplexer 222 may include waveguides connected to the input and the output. As shown in FIG. 2, optical demultiplexer 222 may supply optical signals to optical receivers 226 via waveguides 224.

Waveguide 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receiver 226 may include one or more photodetectors and/or similar devices to receive respective input optical signals outputted by optical demultiplexer 222, to detect sub-carriers associated with the input optical signals, to convert data within the sub-carriers to voltage signals, to convert the voltage signals to digital samples, and to process the digital samples to produce output data corresponding to the input optical signals. Optical receivers 226 may each operate to convert the input optical signal to an electrical signal that represents the transmitted data.

The number and arrangement of components shown in FIG. 2 are provided as an example. In practice, network 200 may include additional components, fewer components, different components, or differently arranged components than those shown in FIG. 2. Additionally, or alternatively, a set of devices (e.g., one or more devices) shown in FIG. 2 may perform one or more functions described herein as being performed by another set of devices shown in FIG. 2.

FIG. 3 is a diagram of example components of an optical transmitter 212. As shown in FIG. 3, optical transmitter 212 may include a Tx DSP 310, one or more DACs 320, a laser 330, and one or more modulators 340. In some implementations, Tx DSP 310, DAC 320, laser 330, and/or modulator 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

Tx DSP 310 may include a digital signal processor. Tx DSP 310 may receive input data from a data source, and may determine a signal to apply to modulator 340 to generate multiple sub-carriers. In some implementations, Tx DSP 310 may receive streams of data, may map the streams of data onto each of the sub-carriers, may independently apply spectral shaping to each of the sub-carriers, and may obtain, based on the spectral shaping of each of the sub-carriers, a sequence of assigned integers to supply to DAC 320. In some implementations, Tx DSP 310 may generate the sub-carriers using time domain filtering and frequency shifting by multiplication in the time domain.

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., a X polarization or a Y polarization) of a signal and/or a particular component of a signal (e.g., an in-phase (I) component or a quadrature (Q) component).

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 216.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization and one for a second polarization. The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the X polarization and a quadrature component of the X polarization), and two DACs 320 may supply voltage signals to the second modulator 340 (e.g., for an in-phase component of the Y polarization and a quadrature component of the Y polarization). The outputs of modulators 340 may be combined back together using combiners (e.g., optical multiplexer 216) and polarization multiplexing.

The number and arrangement of components shown in FIG. 3 are provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 230. Additionally, or alternatively, a set of components shown in FIG. 3 may perform one or more functions described herein as being performed by another set of components shown in FIG. 3.

FIG. 4 is a diagram of example components of optical receiver 226. As shown in FIG. 4, optical receiver 226 may include a local oscillator 410, one or more hybrid mixers 420, one or more detectors 430, one or more ADCs 440, and a Rx DSP 450. In some implementations, local oscillator 410, hybrid mixer 420, detector 430, ADC 440, and/or Rx DSP 450 may be implemented on one or more integrated circuits, such as one or more PICs, one or more ASICs, or the like. In some implementations, components of multiple optical receivers 226 may be implemented on a single integrated circuit, such as a single PIC, to form a super-channel receiver.

Local oscillator 410 may include a laser, a collection of lasers, or a similar device. In some implementations, local oscillator 410 may include a laser to provide an optical signal to hybrid mixer 420. In some implementations, local oscillator 410 may include a single-sided laser to provide an optical signal to hybrid mixer 420. In some implementations, local oscillator 410 may include a double-sided laser to provide multiple optical signals to multiple hybrid mixers 420.

Hybrid mixer 420 may include a combiner that receives a first optical signal (e.g., an input signal from optical demultiplexer 222) and a second optical signal (e.g., from local oscillator 410) and combines the first and second optical signals to generate a combined optical signal. In some implementations, hybrid mixer 420 may split the first optical signal into two orthogonal signals by combining the first optical signal and a second optical signal with zero phase, and by combining the first optical signal and a second optical signal with 90 degrees phase. Hybrid mixer 420 may provide the combined optical signal to detector 430.

Detector 430 may include a photodetector, such as a photodiode, to receive the output optical signal, from hybrid mixer 420, and to convert the output optical signal to corresponding voltage signals. In some implementations, detector 430 may detect the entire spectrum of the output optical signal (e.g., containing all of the sub-carriers).

In some implementations, optical receiver 226 may include multiple detectors 430, which may be used to detect signals of different polarizations and/or to detect different components of the signals (e.g., an I component, a Q component, or the like). For example, a polarization splitter may receive an input signal, and may split the input signal into two substantially orthogonal polarizations, such as the first polarization and the second polarization. Hybrid mixers 420 may combine the polarization signals with optical signals from local oscillator 410. For example, a first hybrid mixer 420 may combine a first polarization signal with the optical signal from local oscillator 410, and a second hybrid mixer 420 may combine a second polarization signal with the optical signal from local oscillator 410.

Detectors 430 may detect the polarization signals to form corresponding voltage signals, and ADCs 440 may convert the voltage signals to digital samples. For example, two detectors 430 may detect the first polarization signals to form the corresponding voltage signals, and a corresponding two ADCs 440 (e.g., that correspond to an I component and a Q component) may convert the voltage signals to digital samples for the first polarization signals. Similarly, two detectors 430 may detect the second polarization signals to form the corresponding voltage signals, and a corresponding two ADCs 440 (e.g., that correspond to an I component and a Q component) may convert the voltage signals to digital samples for the second polarization signals. Rx DSP 450 may process the digital samples for the first and second polarization signals to generate resultant data, which may be outputted as output data.

ADC 440 may include an analog-to-digital converter that converts the voltage signals from detector 430 to digital samples (e.g., at one sample per symbol, two samples per symbol, or the like). ADC 440 may provide the digital samples to Rx DSP 450.

Rx DSP 450 may include a digital signal processor. Rx DSP 450 may receive the digital samples from ADC 440, may demultiplex the samples according to the sub-carriers, may independently process the samples for each of the sub-carriers, may map the processed samples to produce output data, and may output the output data. Rx DSP 450 may include one or more components described in more detail elsewhere herein.

The number and arrangement of components shown in FIG. 4 are provided as an example. In practice, optical receiver 226 may include additional components, fewer components, different components, or differently arranged components than those shown in FIG. 4. For example, the quantity of hybrid mixers 420, detectors 430, and/or ADCs 440 may be selected to implement an optical receiver 226 that is capable of receiving and processing a polarization diverse signal. Additionally, or alternatively, a set of components shown in FIG. 4 may perform one or more functions described herein as being performed by another set of components shown in FIG. 4.

Figure 5:
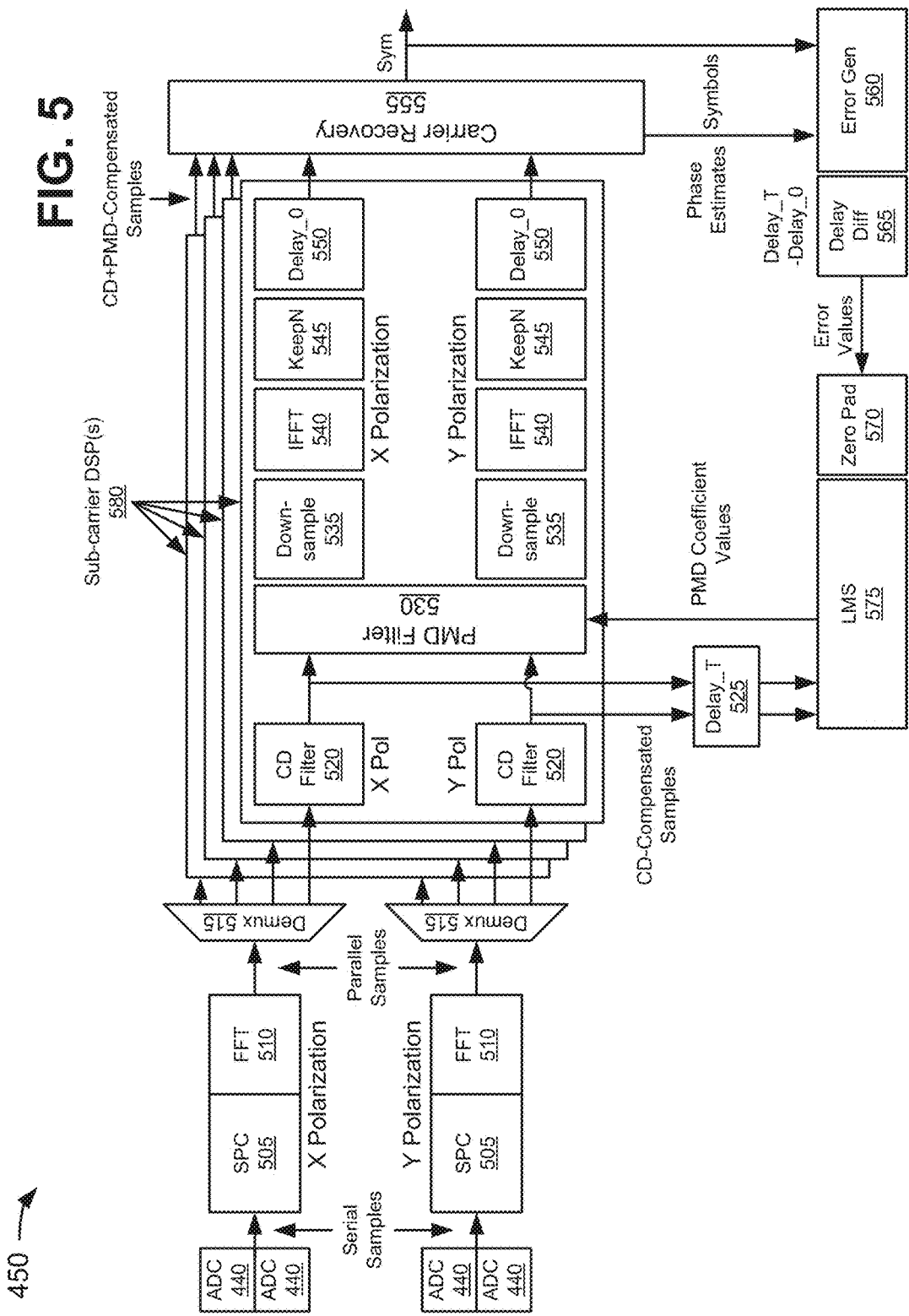
FIG. 5 is a diagram of example components of a receiver digital signal processor shown in FIG. 4.

FIG. 5 is a diagram of example components of Rx DSP 450, shown in FIG. 4. As shown in FIG. 5, Rx DSP 450 may include a serial-to-parallel converter (SPC) 505, a Fast Fourier Transform filter (FFT) 510, a demultiplexer (Demux) 515, a chromatic dispersion filter (CD Filter) 520, a Delay_T component 525, a polarization mode dispersion filter (PMD Filter) 530, a down-sample component 535, an inverse FFT filter (IFFT) 540, a KeepN component 545, a Delay_0 component 550, a carrier recovery component 555, an error generation component (Error Gen) 560, a Delay Diff component 565, a Zero Pad component 570, and a least mean squares adaptive filter (LMS) 575.

As further shown in FIG. 5, Rx DSP 450 may include two SPCs 505, two FFTs 510, and two demultiplexers 515, one for processing samples of the X polarization, and one for processing samples of the Y polarization. Additionally, or alternatively, Rx DSP 450 may include multiple (e.g., four) sub-carrier DSPs 580 for processing samples on different sub-carriers. Each sub-carrier DSP 580 may include components 520-550 and/or components 560-575. Additionally, or alternatively, each sub-carrier DSP 580 may include two CD Filters 520, two down-sample components 535, two IFFTs 540, two KeepN components 545, and two Delay_0 components 550, one for processing samples of the X polarization, and one for processing samples of the Y polarization.

SPC 505 may receive serial samples, of a particular polarization, from ADCs 440, may convert a particular quantity of serial samples into a vector of parallel samples, and may provide the vector to FFT 510. FFT 510 may convert the vector of parallel samples from a time domain to a frequency domain, and may provide the converted vector to demultiplexer 515. Demultiplexer 515 may separate the received vector into samples associated with different sub-carriers, and may provide samples associated with a particular sub-carrier to a particular CD Filter 520 associated with a particular sub-carrier DSP 580.

CD Filter 520 may modify received samples to compensate for chromatic dispersion, and may provide the modified samples to Delay_T 525 and PMD Filter 530. Delay_T 525 may wait a particular amount of time before providing the modified samples to LMS 575. PMD Filter 530 may modify the samples to compensate for polarization mode dispersion. PMD Filter 530 may receive PMD coefficient values from LMS 575, and may use the PMD coefficient values to modify the samples. PMD Filter 530 may provide the CD and PMD compensated samples to down-sample component 535, which may down-sample the received samples. IFFT 540 may receive the down-sampled samples from down-sample component 535, may convert the samples from the frequency domain to the time domain, and may provide the converted samples to KeepN component 545. KeepN component 545 may keep some of the converted samples and may discard others, and may provide the samples that were kept to Delay_0 component 550.

Delay_0 component 550 may wait a particular amount of time (e.g., based on a particular sub-carrier with which Delay_0 component 550 is associated) before providing the kept samples to carrier recovery component 555. Carrier recovery component 555 may perform carrier recovery on samples received from each sub-carrier DSP 580 (e.g., by averaging carrier recovery operations across two or more sub-carriers, by performing carrier recovery operations independently for each sub-carrier, or the like), and may decode the received samples into symbols with phase estimates. Carrier recovery component 555 may provide a symbol value and a phase estimate value to Error Gen 560, which may use the received values to generate error values. Error Gen 560 may provide the error values to Delay Diff 565, which may wait a particular amount of time (e.g., equal to the value of Delay_T minus Delay_0) before providing the error values to Zero Pad 570.

Zero Pad 570 may pad the received error values with zeros, and may provide the padded values to LMS 575. LMS 575 may apply a least mean squares algorithm, to the received error values and the received CD-compensated samples, to update PMD coefficient values. LMS 575 may provide the updated PMD coefficient values to PMD Filter 530. PMD Filter 530 may use the updated PMD coefficient values to modify a manner in which PMD Filter 530 modifies received samples to compensate for polarization mode dispersion. In some implementations, the PMD coefficient values may also include CD coefficient values (e.g., CD filter coefficients), or the PMD coefficient values and the CD coefficient values may be combined. CD Filter 520 may update CD coefficient values, used to compensate for chromatic dispersion, based on the CD coefficient values.

The number and arrangement of components shown in FIG. 5 are provided as an example. In practice, Rx DSP 450 may include additional components, fewer components, different components, or differently arranged components than those shown in FIG. 5. Additionally, or alternatively, a set of components of Rx DSP 450 may perform one or more functions described as being performed by another set of components of Rx DSP 450.

Figure 6B:
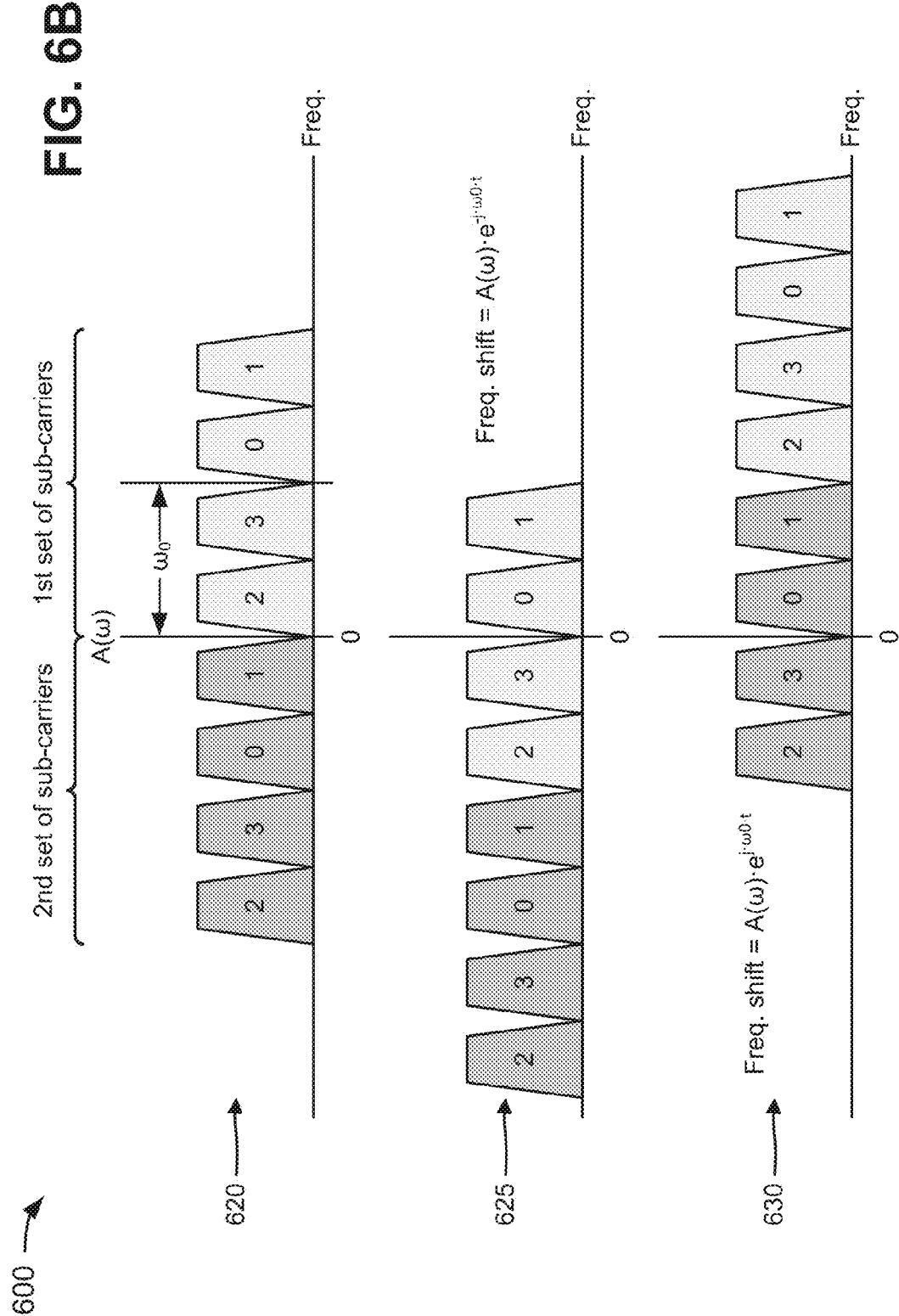
Figure 6C:
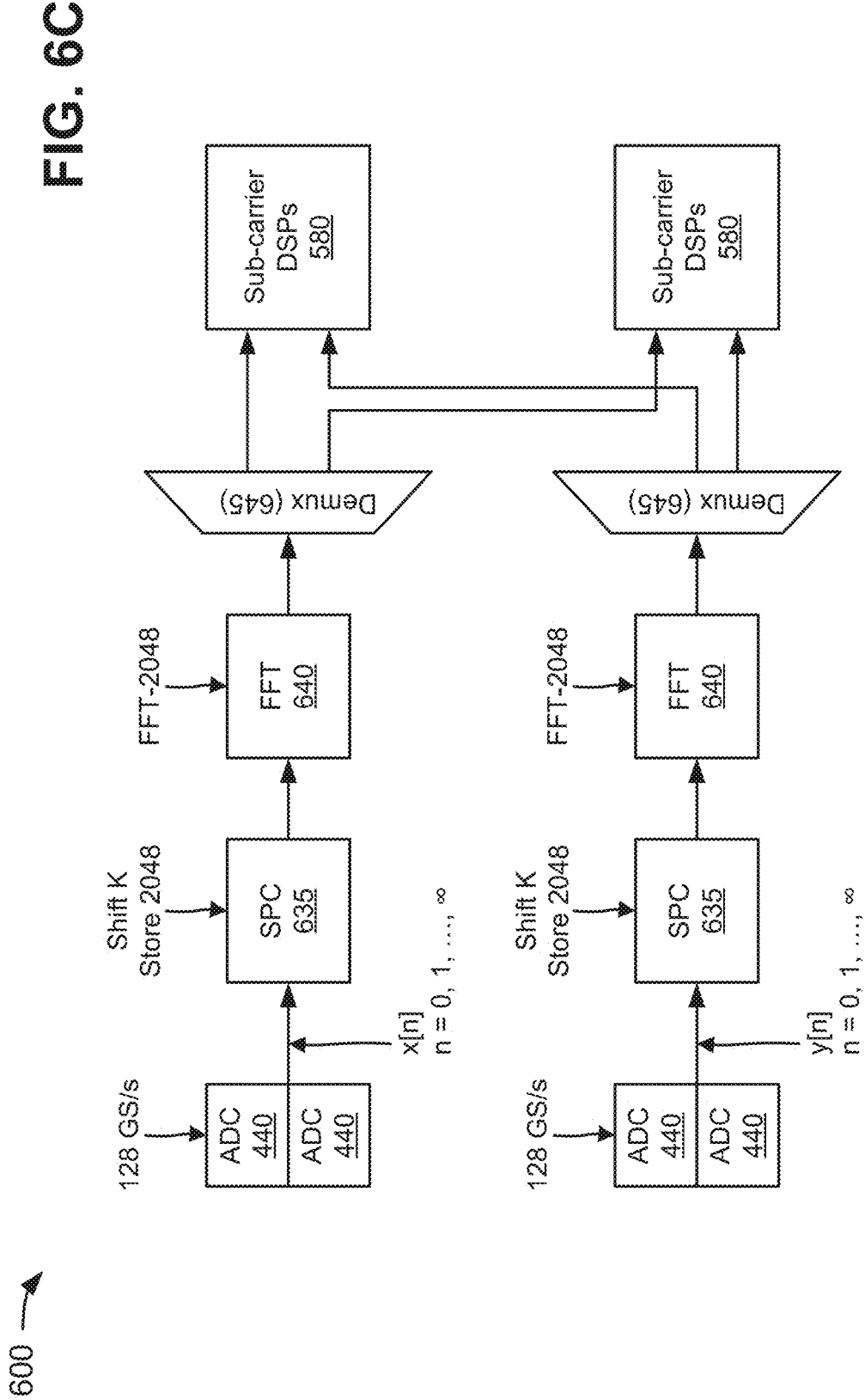

FIGS. 6A-6C are diagrams of an example implementation 600 relating to operations performed by components of Rx DSP 450, shown in FIGS. 4 and 5. As shown in FIG. 6A, a multiplier component 605, a low pass filter (LPF) 610, and a down-sample component (DS 2x) 615 may be positioned between ADCs 440 and the rest of Rx DSP 450 (e.g., between ADCs 440 and SPC 505). In some implementations, multiplier component 605, LPF 610, and down-sample component 615 may be external to Rx DSP 450. In the description to follow, multiplier component 605, LPF 610, and down-sample component 615 may be part of Rx DSP 450. Multiplier component 605, LPF 610, and down-sample component 615 may enable Rx DSP 450 to handle more sub-carriers (e.g., eight sub-carriers), to handle higher data rates (e.g., 200 Gb), and to provide a composite symbol rate of 64 Gbaud. The operations described in connection with FIG. 6A may be referred to as a time domain approach.

As further shown in FIG. 6A, Rx DSP 450 may include four multiplier components 605, four LPFs 610, and four down-sample components 615, two for processing samples of the X polarization, and two for processing samples of the Y polarization. Additionally, two Rx DSPs 450 with multiple (e.g., eight) sub-carrier DSPs 580 may be used for processing samples on different sub-carriers (e.g., a first Rx DSP 450 with four sub-carrier DSPs 580 for processing a first set of four sub-carriers, and a second Rx DSP 450 with another four sub-carrier DSPs 580 for processing a second set of four sub-carriers). Each sub-carrier DSP 580 may include components 505-575 (e.g., as shown in FIG. 5). In the example shown in FIG. 6A, ADCs 440 may include a sampling rate that is two times greater than the sampling rate of ADCs 440 in FIG. 5.

As shown in FIG. 6B, Rx DSP 450 may be modified to accommodate a 64 Gbaud optical signal that includes eight sub-carriers, as indicated by reference number 620. Each sub-carrier may occupy one eighth of the overall signal bandwidth (e.g., allocated spectrum $A(\omega)$), and may include a symbol rate of 8 Gbaud. As further shown in FIG. 6B, two sub-carriers may represent a radian frequency ($\omega_0$) of the optical signal, and Rx DSP 450 may divide the eight sub-carriers into the first set of four sub-carriers and the second set of four sub-carriers.

Returning to FIG. 6A, the top two multiplier components 605 may demodulate the first set of four sub-carriers by applying a first multiplier (e.g., $e^{-j-\omega_0 -t}$) to the first set of four sub-carriers. In some implementations, the first multiplier may frequency shift, and center at zero, the first set of four sub-carriers, as indicated by reference number 625 in FIG. 6B. The bottom two multiplier components 605 may demodulate the second set of four sub-carriers by applying a second multiplier (e.g., $e^{j-\omega_0 -t}$) to the second set of four sub-carriers. In some implementations, the second multiplier may frequency shift, and center at zero, the second set of four sub-carriers, as indicated by reference number 630 in FIG. 6B. Multiplier components 605 may provide the frequency-shifted first set of four sub-carriers and the frequency-shifted second set of four sub-carriers to LPFs 610. In some implementations, the frequency shifting of the sub-carriers may enable the eight sub-carriers to be divided into the two sets and may enable different Rx DSPs 450 to process the different sets of sub-carriers.

LPFs 610 may remove possible aliasing noise in the frequency-shifted first set of four sub-carriers and the frequency-shifted second set of four sub-carriers. In some implementations, LPF 610 may include a tapped delay line filter that delays an input signal by a specified number of sample periods and outputs delayed versions of the input signal. LPFs 610 may provide the frequency-shifted first set of four sub-carriers and the frequency-shifted second set of four sub-carriers, with the noise removed, to down-sample components 615.

Down-sample components 615 may down-sample the frequency-shifted first set of four sub-carriers and the frequency-shifted second set of four sub-carriers, with the noise removed, by a particular factor. In some implementations, down-sample components 615 may down-sample the frequency-shifted first set of four sub-carriers and the frequency-shifted second set of four sub-carriers by a factor of two when ADCs 440 include a sampling rate that is two times greater than the sampling rate of ADCs 440 in FIG. 5. In some implementations, down-sample components 615 may perform the down sampling by accepting every second sample. For example, down-sample components 615 may accept even samples and may reject odd samples. In some implementations, LPF 610 and down-sample component

615 may provide down-sampling by a factor that is different than two (e.g., 1.2, 1.5, or the like).

Two down-sample components 615 may provide the down-sampled data, associated with the first set of four sub-carriers, to the first Rx DSP 450 (e.g., with four sub-carrier DSPs 580), via two SPCs 505, two FFTs 510, and two demultiplexers 515. Another two down-sample components 615 may provide the down-sampled data, associated with the second set of four sub-carriers, to the second Rx DSP 450 (e.g., with another four sub-carrier DSPs 580), via two SPCs 505, two FFTs 510, and two demultiplexers 515. Rx DSPs 450 with sub-carrier DSPs 580 may process the down-sampled data as set forth above in connection with FIGS. 4 and 5.

In some implementations, a first forward error correction (FEC) decoder may receive data from the first Rx DSP 450, and a second FEC decoder may receive data from the second Rx DSP 450. The first FEC decoder and the second FEC decoder may process the received data independently of each other. For example, the first FEC decoder and the second FEC decoder may decode the received data using a block code, a convolution code, a product turbo code, a low density parity check (LDPC) code, and/or some other code or technique. Alternatively, in some implementations, the data from the first Rx DSP 450 and the data from the second Rx DSP 450 may be combined or interleaved together, and the combined data may be provided to a single FEC decoder. In such implementations, the FEC decoding may be applied to all eight sub-carriers jointly, which may improve performance of optical receiver 226.

As shown in FIG. 6C, SPCs 505 may be replaced with SPCs 635, FFTs 510 may be replaced with FFTs 640, and demultiplexers 515 may be replaced with demultiplexers 645 in Rx DSP 450. SPCs 635, FFTs 640, and demultiplexers 645 may be positioned between ADCs 440 and the rest of Rx DSP 450 (e.g., between ADCs 440 and sub-carrier DSPs 580). SPCs 635, FFTs 640, and demultiplexers 645 may enable Rx DSP 450 to handle more sub-carriers (e.g., eight sub-carriers), to handle higher data rates (e.g., 200 Gb), and to provide a composite symbol rate of 64 Gbaud. The operations described in connection with FIG. 6C may be referred to as a frequency domain approach.

As further shown in FIG. 6C, Rx DSP 450 may include two SPCs 635, two FFTs 640, and two demultiplexers 645, one for processing samples of the X polarization, and one for processing samples of the Y polarization. Additionally, two Rx DSPs 450 with multiple (e.g., eight) sub-carrier DSPs 580 may be used for processing samples on different sub-carriers (e.g., a first Rx DSP 450 with four sub-carrier DSPs 580 for processing a first set of four sub-carriers, and a second Rx DSP 450 with another four sub-carrier DSPs 580 for processing a second set of four sub-carriers). Each sub-carrier DSP 580 may include components 520-575 (e.g., as shown in FIG. 5). In the example shown in FIG. 6C, ADCs 440 may include a sampling rate that is two times greater than the sampling rate of ADCs 440 in FIG. 5.

As further shown in FIG. 6C, ADCs 440 may provide samples on the X polarization to a first SPC 635. In some implementations, one ADC 440 may provide real values for the sample to the first SPC 635, and one ADC 440 may provide imaginary values for the sample to the first SPC 635. A sample on the X polarization may be represented as $x[n]$, where n represents a sample number (e.g., $n=0, 1, 2, \ldots, \infty$). Similarly, other ADCs 440 may provide samples on the Y polarization to a second SPC 635. A sample on the Y polarization may be represented as $y[n]$. In some implementations, ADCs 440 may operate at a sampling rate of 128 gigasamples per second (GS/s).

SPCs 635 may convert serial input samples to a parallel vector of output samples, such as by combining multiple samples, received in series, into a vector of samples. A size i of the vector may be configurable. In some implementations, SPCs 635 may utilize a vector size of 2048 samples (e.g., Store 2048), such that the vector $x[i]$ represents a vector of 2048 samples, where i is equal to 0 through 2047. SPCs 635 may provide the vector of samples to FFTs 640.

In some implementations, SPC 635 may generate successive vectors by including, in a next vector, some samples included in a previous vector and some samples not included in the previous vector (e.g., by using an overlap and save algorithm). For example, SPC 635 may start the next vector by determining a sample number at the beginning of the previous vector, and shifting forward (e.g., to a higher sample number) using a shift value K, to determine a sample number to start the next vector. As an example, assume that K=1024, and that the first vector $x[0:2047]$ includes sample numbers 0 through 2047. In this case, SPC 635 would determine the second vector as $x[(0:2047)+1 \times K]$, or $x[1024: 3071]$, which includes sample numbers 1024 through 3071. In some implementations, the value of K may be set equal to one half of the size of the vector (e.g., K=1024 for a vector size of 2048). Additionally, or alternatively, different values of K may be used to compensate for different amounts of dispersion and/or to control a clock rate with which FFT 640 operates.

FFT 640 may perform a fast Fourier transform to convert the vector of samples in the time domain (e.g., $x[i]$) to a vector of samples in the frequency domain (e.g., $X[i+z \times K]$), where $i+z \times K$ is equal to the range of 2048 values determined based on shifting i by the shift value K (e.g., where $z=0, 1, 2, \ldots$). In some implementations, a size (e.g., 2048) of FFT 640 may be two times greater than a size (e.g., 1024) of FFT 510. Due to the use of multiple sub-carriers, a quantity of samples (e.g., a size) required by FFT 640 to compensate for a particular amount of dispersion is smaller than would be necessary to compensate for the particular amount of dispersion if only a single carrier were used. In some implementations, a clock rate of FFT 640 may be controlled by adjusting the shift value K. For example, a rate of execution of FFT 640 may be calculated by dividing the rate of the input signal (e.g., $x[n]$) by the value of K (e.g., FFT rate=128 GS/s/1024). This means that for eight sub-carriers, the effective sample rate for each sub-carrier is 16 samples per baud. As further shown in FIG. 6C, FFTs 640 may provide the frequency domain vector of samples to demultiplexers 645.

Demultiplexers 645 may demultiplex the frequency domain vector of samples into separate frequency domain vectors corresponding to different sub-carriers. Demultiplexers 515 may select a vector of samples to capture samples from frequency values associated with a sub-carrier. For example, a first demultiplexer 645 may select an X vector of samples associated with a first sub-carrier (e.g., X0[k]) of the first set of four sub-carriers, may select an X vector of samples associated with a second sub-carrier (e.g., X1[k]) of the first set of four sub-carriers, may select an X vector of samples associated with a third sub-carrier (e.g., X2[k]) of the first set of four sub-carriers, and may select an X vector of samples associated with a fourth sub-carrier (e.g., X3[k]) of the first set of four sub-carriers. The first demultiplexer 645 may provide the selected X vectors (e.g., X0[k], X1[k], X2[k], and X3[k]) of the first set of four sub-carriers to a first Rx DSP 450 (e.g., with four sub-carrier DSPs 580).

The first demultiplexer 645 may select an X vector of samples associated with a first sub-carrier (e.g., X0[k]) of the second set of four sub-carriers, may select an X vector of samples associated with a second sub-carrier (e.g., X1[k]) of the second set of four sub-carriers, may select an X vector of samples associated with a third sub-carrier (e.g., X2[k]) of the second set of four sub-carriers, and may select an X vector of samples associated with a fourth sub-carrier (e.g., X3[k]) of the second set of four sub-carriers. The first demultiplexer 645 may provide the selected X vectors (e.g., X0[k], X1[k], X2[k], and X3[k]) of the second set of four sub-carriers to a second Rx DSP 450 (e.g., with four sub-carrier DSPs 580).

A second demultiplexer 645 may select a Y vector of samples associated with a first sub-carrier (e.g., Y0[k]) of the first set of four sub-carriers, may select a Y vector of samples associated with a second sub-carrier (e.g., Y1[k]) of the first set of four sub-carriers, may select a Y vector of samples associated with a third sub-carrier (e.g., Y2[k]) of the first set of four sub-carriers, and may select a Y vector of samples associated with a fourth sub-carrier (e.g., Y3[k]) of the first set of four sub-carriers. The second demultiplexer 645 may provide the selected Y vectors (e.g., Y0[k], Y1[k], Y2[k], and Y3[k]) of the first set of four sub-carriers to the first Rx DSP 450.

The second demultiplexer 645 may select a Y vector of samples associated with a first sub-carrier (e.g., Y0[k]) of the second set of four sub-carriers, may select a Y vector of samples associated with a second sub-carrier (e.g., Y1[k]) of the second set of four sub-carriers, may select a Y vector of samples associated with a third sub-carrier (e.g., Y2[k]) of the second set of four sub-carriers, and may select a Y vector of samples associated with a fourth sub-carrier (e.g., Y3[k]) of the second set of four sub-carriers. The second demultiplexer 645 may provide the selected Y vectors (e.g., Y0[k], Y1[k], Y2[k], and Y3[k]) of the second set of four sub-carriers to the second Rx DSP 450.

In some implementations, demultiplexers 645 may provide all samples (e.g., X and Y) associated with the first set of four sub-carriers to the first set Rx DSP 450, and may provide all samples (e.g., X and Y) associated with the second set of four sub-carriers to the second RX DSP 450. Alternatively, demultiplexers 645 may provide all samples (e.g., X and Y) associated with the first set of four sub-carriers to the second Rx DSP 450, and may provide all samples (e.g., X and Y) associated with the second set of four sub-carriers to the first Rx DSP 450. The first and second Rx DSPs 450, and sub-carrier DSPs 580 associated with the first and second Rx DSPs 450, may process the samples as set forth above in connection with FIGS. 4 and 5.

In some implementations, a first FEC decoder may receive data from the first Rx DSP 450, and a second FEC decoder may receive data from the second Rx DSP 450. The first FEC decoder and the second FEC decoder may process the received data independently of each other. Alternatively, in some implementations, the data from the first Rx DSP 450 and the data from the second Rx DSP 450 may be combined or interleaved together, and the combined data may be provided to a single FEC decoder. In such implementations, the FEC decoding may be applied to all eight sub-carriers jointly, which may improve performance of optical receiver 226.

The number and arrangement of components shown in FIGS. 6A-6C are provided as an example. In practice, Rx DSP 450 may include additional components, fewer components, different components, or differently arranged components than those shown in FIGS. 6A-6C. Additionally, or alternatively, a set of components of Rx DSP 450 may perform one or more functions described as being performed by another set of components of Rx DSP 450.

Figure 7A:
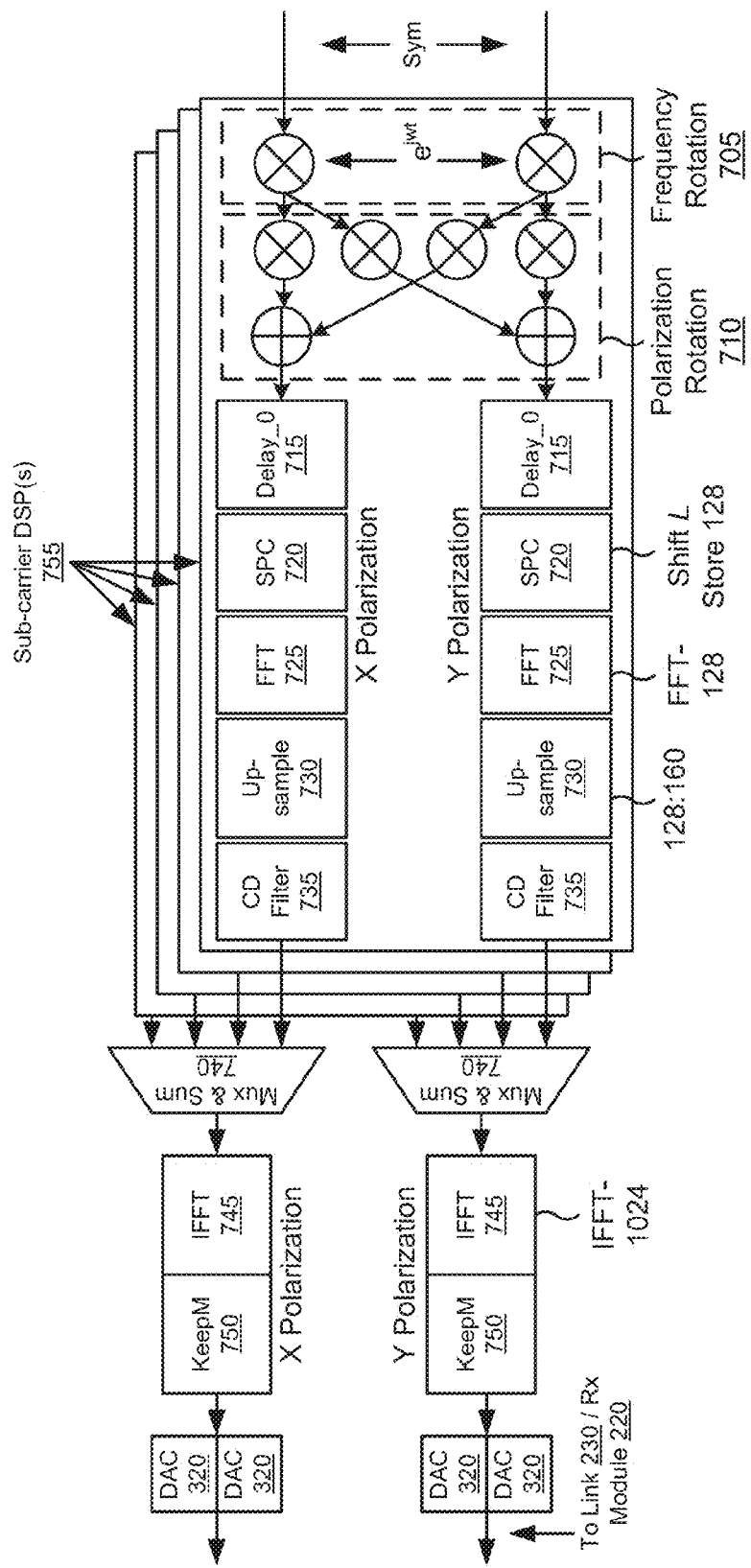
Figure 7C:
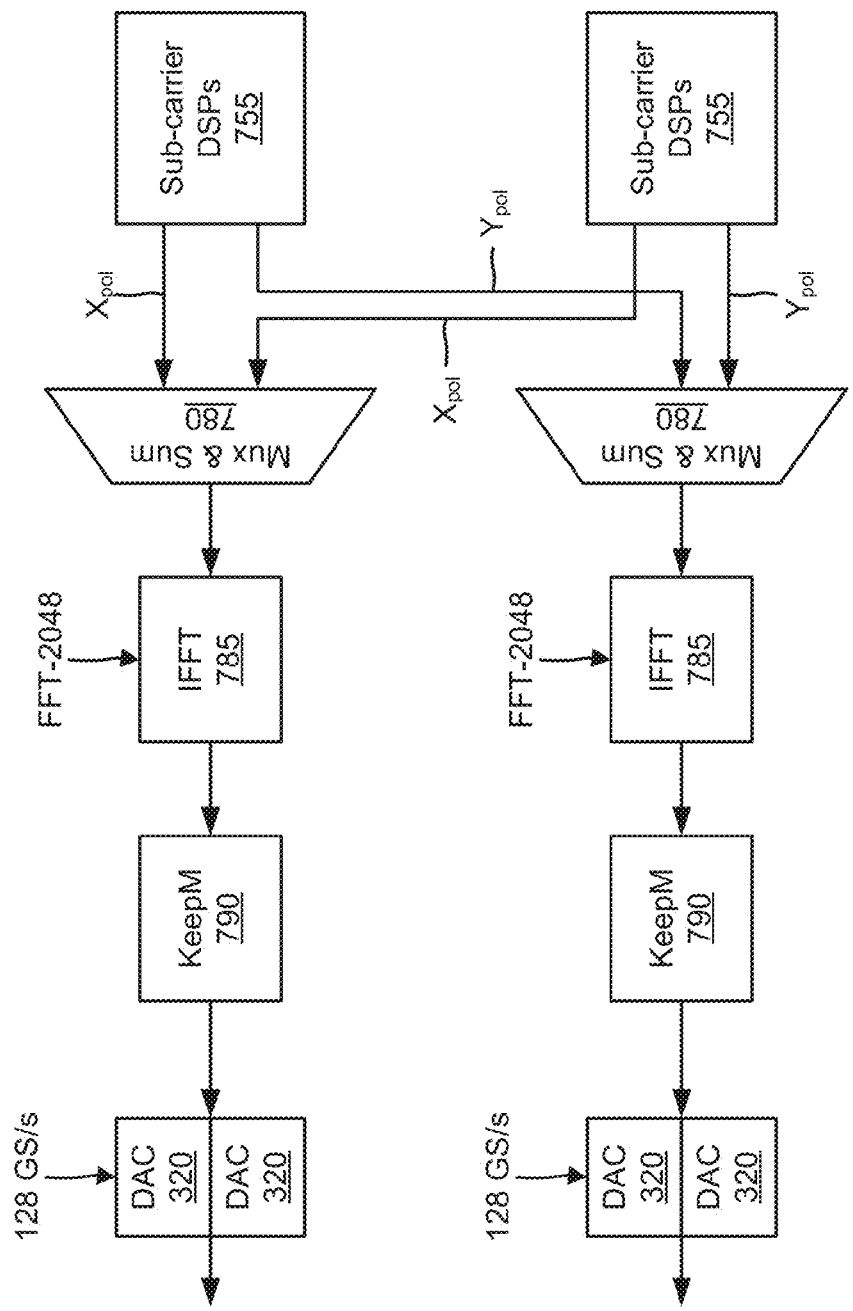

FIGS. 7A-7C are diagrams of example components of Tx DSP 310, shown in FIG. 3. As shown in FIG. 7A, Tx DSP 310 may include a frequency rotation component 705, a polarization rotation component 710, a Delay_0 component 715, a SPC 720, a FFT 725, an up-sample component 730, a CD Filter 735, a multiplexer (Mux & Sum) 740, an IFFT 745, and a KeepM component 750.

As further shown in FIG. 7A, Tx DSP 310 may include two multiplexers 740, two IFFTs 745, and two KeepM components 750, one for processing samples of the X polarization, and one for processing samples of the Y polarization. Additionally, or alternatively, Tx DSP 310 may include multiple sub-carrier DSPs 755 for processing samples on different sub-carriers. Each sub-carrier DSP 755 may include components 705-735. Additionally, or alternatively, each sub-carrier DSP 755 may include two frequency rotation components 705, two polarization rotation components 710, two Delay_0 components 715, two SPCs 720, two FFTs 725, two up-sample components 730, and two CD filters 735, one for processing samples of the X polarization, and one for processing samples of the Y polarization.

As shown, frequency rotation component 705 may receive samples with symbols (Sym), and may apply a frequency shift to the sample to specify an amount of separation between sub-carriers. As an example, frequency rotation component 705 may use a multiplier component to rotate a received sample by a value shown as $e^{j\omega t}$, where $\omega$ represents a frequency value that is ramped over time t. Frequency rotation component 705 may provide the rotated sample to polarization rotation component 710.

Polarization rotation component 710 may rotate a polarization of a received sample. For example, polarization rotation component 710 may create the X polarization and the Y polarization for a sample. In some implementations, polarization rotation component 710 may rotate samples by different amounts based on the sub-carrier with which polarization rotation component 710 is associated. For example, polarization rotation component 710 may rotate samples by 0°, 45°, 0°, 45°, 0°, 45°, 0°, and 45° (e.g., which may represent power exchange angles) for sub-carriers 0, 1, 2, 3, 4, 5, 6, and 7, respectively. Such polarization rotation reduces the amount of bit errors received at Rx module 220 as a result of significant polarization dependent loss and noise accumulated due to transmission over link 230. The polarization rotation angles may be configurable, in some implementations. Polarization rotation component 710 may provide the rotated sample to Delay_0 component 715.

Delay_0 component 715 may wait for a particular amount of time (e.g., depending on a sub-carrier with which Delay_0 component 715 is associated) before providing the rotated sample to SPC 720, in a similar manner as described elsewhere herein in connection with Delay_0 component 550. SPC 720 may receive samples, on a particular polarization, and may convert a particular quantity of serial samples into a vector of parallel samples, in a similar manner as described elsewhere herein in connection with SPC 505. As shown, SPC 720 may use a vector size of 128, and may apply a shift value of L. SPC 720 may be configured to use different shift values to adjust an amount of dispersion compensation and/or an amount of power dissipation of Tx DSP 310, in a similar manner as described elsewhere herein with respect to SPC 505. SPC 720 may provide the vector of samples to FFT 725. FFT 725 may convert the vector of parallel samples from a time domain to a frequency domain, in a similar manner as described elsewhere herein in connection with FFT 510. As shown, FFT 725 may have a size of 128.

FFT 725 may provide the vector of 128 samples to up-sample component 730, which may up-sample the received samples (e.g., to form a vector of 160 samples, as shown).

As an example, up-sample component 730 may receive a vector of 128 samples $X_{input}[i]$, where i=0, 1, 2, ..., 127, and may output a vector of 160 samples $X_{output}[k]$, where k=0, 1, 2, ..., 159. In some implementations, the first 80 samples of $X_{output}[k]$ may be set equal to the first 80 samples of $X_{input}[i]$, such that $X_{output}[0, 1, ..., 79]=X_{input}[0, 1, ..., 79]$. Furthermore, the last 80 samples of $X_{output}[k]$ may be set equal to the last 80 samples of $X_{input}[i]$, such that $X_{output}[80, 81, ..., 159]=X_{input}[48, 49, ..., 127]$. These quantities of samples are provided as an example, and up-sample component 730 may use other quantities of samples to up-sample the vector, in some implementations.

Up-sample component 730 may provide the up-sampled vector of samples to CD Filter 735. CD Filter 735 may modify received samples to compensate for chromatic dispersion, in a similar manner as described herein in connection with CD Filter 520. CD Filter 735 may provide CD-compensated samples to multiplexer 740.

Multiplexer 740 may receive samples from different sub-carriers (e.g., four sub-carriers, eight sub-carriers, etc.), and may multiplex the samples together for transmission over link 230. In some implementations, each sub-carrier DSP 755 may output 160 samples for each polarization (e.g., the X polarization and the Y polarization), and the samples may overlap one another in the frequency domain. To process the overlapping samples, multiplexer 740 may include an adder that shifts the samples in the frequency domain such that the samples for each sub-carrier do not overlap. Multiplexer 740 may provide the multiplexed samples to IFFT 745.

IFFT 745 may receive the multiplexed samples from multiplexer 740, may convert the samples from the frequency domain to the time domain, and may provide the converted samples to KeepM component 750, in a similar manner as described elsewhere herein in connection with IFFT 540. KeepM component 750 may keep some of the converted samples and may discard others, and may provide the samples that were kept to DACs 320. KeepM component 750 may be configured to keep and/or discard different quantities of samples to adjust an amount of dispersion compensation and/or an amount of power dissipation of Tx DSP 310, in a similar manner as described elsewhere herein with respect to KeepN component 545.

DACs 320 may convert the received samples from digital form to analog form (e.g., from a digital sample to an analog optical signal), and may provide the analog signals to Rx module 220 via link 230. In some implementations, Tx DSP 310 may include four DACs: one associated with real values for a sample of the X polarization, one associated with imaginary values for the sample of the X polarization, one associated with real values for a sample of the Y polarization, and one associated with imaginary values for the sample of the Y polarization.

As shown in FIG. 7B, a zero insert component 760, a LPF 765, a multiplier component 770, and a sum component 775, may be positioned between DACs 320 and the rest of Tx DSP 310 (e.g., between KeepM component 750 and DACs 320). The operations described in connection with FIG. 7B may be referred to as a time domain approach. In some implementations, zero insert component 760, LPF 765, multiplier component 770, and sum component 775 may be external to Tx DSP 310. In the description to follow, zero insert component 760, LPF 765, multiplier component 770, and sum component 775 may be provided within Tx DSP 310. Zero insert component 760, LPF 765, multiplier component 770, and sum component 775 may enable Tx DSP 310 to handle more sub-carriers (e.g., eight sub-carriers), to handle higher data rates (e.g., 200 Gb), and to provide a composite symbol rate of 64 Gbaud.

As further shown in FIG. 7B, Tx DSP 310 may include four zero insert components 760, four LPFs 765, and four multiplier components 770, two for processing samples of the X polarization, and two for processing samples of the Y polarization. Tx DSP 310 may include two sum components 775, one for processing samples of the X polarization, and one for processing samples of the Y polarization. Additionally, two Tx DSPs 310 with multiple (e.g., eight) sub-carrier DSPs 755 may be used for processing samples on different sub-carriers (e.g., a first Tx DSP 310 with four sub-carrier DSPs 755 for processing a first set of four sub-carriers, and a second Tx DSP 310 with another four sub-carrier DSPs 755 for processing a second set of four sub-carriers). Each sub-carrier DSP 755 may include components 705-750 (e.g., as shown in FIG. 7A).

Tx DSP 310 may be modified to accommodate a 64 Gbaud optical signal that includes eight sub-carriers. Each sub-carrier may occupy one eighth of the overall signal bandwidth (e.g., allocated spectrum $A(\omega)$), and may include a symbol rate of 8 Gbaud. Two sub-carriers may represent a radian frequency ($\omega_0$) of the optical signal, and Tx DSP 310 may divide the eight sub-carriers into the first set of four sub-carriers and the second set of four sub-carriers.

The top two zero insert components 760 may receive samples, associated with the first set of four sub-carriers, from the first Tx DSP 310 (e.g., with four sub-carrier DSPs 755), via two KeepM components 750. The bottom two zero insert components 760 may receive samples, associated with the second set of four sub-carriers, from a second Tx DSP 310 (e.g., with another four sub-carrier DSPs 755), via two KeepM components 750. Tx DSPs 310 with sub-carrier DSPs 755 may process the samples as set forth above in connection with FIGS. 3 and 7A.

Zero insert components 760 may receive the samples associated with the first set of four sub-carriers and the second set of four sub-carriers from KeepM components 750. In some implementations, zero insert components 760 may add a zero after every sample in order to up-sample the samples by a factor of two. Zero insert components 760 may provide the up-sampled samples to LPFs 765.

LPFs 765 may remove possible aliasing noise in the up-sampled samples associated with the first set of four sub-carriers and the second set of four sub-carriers. In some implementations, LPF 765 may include a tapped delay line filter that delays an input signal by a specified number of sample periods and outputs delayed versions of the input signal. LPFs 765 may provide the up-sampled samples associated with the first set of four sub-carriers and the second set of four sub-carriers, with the noise removed, to multiplier components 770. In some implementations, zero insert component 760 and LPF 765 may provide an up-sampling rate of two based on a sampling rate of DACs 320. In some implementations, zero insert component 760 and LPF 765 may provide different up-sampling rates (e.g., 1.2, 1.5, or the like) based on the sampling rate of DACs 320. In some implementations, zero insert component 760 and LPF 765 may provide an up-sampling rate that is different than a down-sampling rate provided by LPF 610 and down-sample component 615.

The top two multiplier components 770 may receive the up-sampled samples from the top two LPFs 765, and may frequency shift the first set of four sub-carriers by applying a first multiplier (e.g., $e^{j-\omega_0-r}$) to the first set of four sub-carriers. In some implementations, the first multiplier may frequency shift, and center at zero, the first set of four sub-carriers. In some implementations, the first multiplier may frequency shift the first set of sub-carriers in a direction that is opposite to the direction described above for the top two multiplier components 605 (FIG. 6A). The bottom two multiplier components 770 may receive the up-sampled samples from the bottom two LPFs 765, and may frequency shift the second set of four sub-carriers by applying a second multiplier (e.g., $e^{-j-\omega_0-r}$) to the second set of four sub-carriers. In some implementations, the second multiplier may frequency shift, and center at zero, the second set of four sub-carriers. In some implementations, the second multiplier may frequency shift the second set of sub-carriers in a direction that is opposite to the direction described above for the bottom two multiplier components 605 (FIG. 6A). Multipliers 770 may provide the frequency-shifted first set of sub-carriers and the frequency-shifted second set of sub-carriers to sum components 775.

Sum components 775 may receive the frequency-shifted first set of sub-carriers and the frequency-shifted second set of sub-carriers, and may sum the frequency-shifted first set of sub-carriers and the frequency-shifted second set of sub-carriers to form final multiplexed signals. Sum components 775 may provide the final multiplexed signals to DACs 320, and the multiplexed signals may be processed by DACs 320. For example, DACs 320 may convert the multiplexed signals from digital form to analog form (e.g., from a digital signal to an analog signal at 128 GS/s), and may provide the analog signal to a modulator. The modulator may modulate an optical signal with the analog signal, and may provide the optical signal to Rx module 220 via link 230.

As shown in FIG. 7C, multiplexers 740 may be replaced with multiplexers 780, IFFTs 745 may be replaced with IFFTs 785, and KeepM components 750 may be replaced with KeepM components 790 in Tx DSP 310. Multiplexers 780, IFFTs 785, and KeepM components 790 may be positioned between DACs 320 and the rest of Tx DSP 310 (e.g., between DACs 320 and sub-carrier DSPs 755). Multiplexers 780, IFFTs 785, and KeepM components 790 may enable Tx DSP 310 to handle more sub-carriers (e.g., eight sub-carriers), to handle higher data rates (e.g., 200 Gb), and to provide a composite symbol rate of 64 Gbaud. The operations described in connection with FIG. 7C may be referred to as a frequency domain approach.

As further shown in FIG. 7C, Tx DSP 310 may include two multiplexers 780, two IFFTs 785, and two KeepM components 790, one for processing samples of the X polarization, and one for processing samples of the Y polarization. Additionally, two Tx DSPs 310 with multiple (e.g., eight) sub-carrier DSPs 755 may be used for processing samples on different sub-carriers (e.g., a first Tx DSP 310 with four sub-carrier DSPs 755 for processing a first set of four sub-carriers, and a second Tx DSP 310 with another four sub-carrier DSPs 755 for processing a second set of four sub-carriers). Each sub-carrier DSP 755 may include components 705-735 (e.g., as shown in FIG. 7A). In the example shown in FIG. 7C, DACs 320 may include a sampling rate (e.g., 128 GS/s) that is two times greater than the sampling rate of DACs 320 in FIG. 7A.

As further shown in FIG. 7C, a first set of sub-carrier DSPs 755 may output data from a first set of four sub-carriers associated with a X polarization ($X_{pol}$) and a Y polarization ($Y_{pol}$). A second set of sub-carrier DSPs 755 may output data from a second set of four sub-carriers associated with a X polarization ($X_{pol}$) and a Y polarization ($Y_{pol}$). The four X polarization sub-carriers from the first set of sub-carrier DSPs 755 and the four X polarization sub-carriers from the second set of sub-carrier DSPs 755 may be provided to a first multiplexer 780. The first multiplexer 780 may combine the four X polarization sub-carriers from the first set of sub-carrier DSPs 755 and the four X polarization sub-carriers from the second set of sub-carrier DSPs 755 to form a first 2048 point frequency domain vector (e.g., as shown by reference number 620 in FIG. 6B). The first multiplexer 780 may provide the first 2048 point frequency domain vector to a first IFFT 785.

The four Y polarization sub-carriers from the first set of sub-carrier DSPs 755 and the four Y polarization sub-carriers from the second set of sub-carrier DSPs 755 may be provided to a second multiplexer 780. The second multiplexer 780 may combine the four Y polarization sub-carriers from the first set of sub-carrier DSPs 755 and the four Y polarization sub-carriers from the second set of sub-carrier DSPs 755 to form a second 2048 point frequency domain vector (e.g., as shown by reference number 620 in FIG. 6B). The second multiplexer 780 may provide the second 2048 point frequency domain vector to a second IFFT 785.

The first IFFT 785 may receive the first 2048 point frequency domain vector from the first multiplexer 780, may convert the first 2048 point frequency domain vector from the frequency domain to the time domain, and may provide the converted vector to a first KeepM component 790, in a similar manner as described elsewhere herein in connection with IFFT 540. The second IFFT 785 may receive the second 2048 point frequency domain vector from the second multiplexer 780, may convert the second 2048 point frequency domain vector from the frequency domain to the time domain, and may provide the converted vector to a second KeepM component 790, in a similar manner as described elsewhere herein in connection with IFFT 540.

The first KeepM component 790 may keep some samples of the first converted vector and may discard other samples (e.g., keep 1024 samples and discard 1024 sample), and may provide the samples of the first converted vector that were kept to DACs 320. The first KeepM component 790 may be configured to keep and/or discard different quantities of samples to adjust an amount of dispersion compensation and/or an amount of power dissipation of Tx DSP 310, in a similar manner as described elsewhere herein with respect to KeepN component 545. The second KeepM component 790 may keep some samples of the second converted vector and may discard other samples (e.g., keep 1024 samples and discard 1024 sample), and may provide the samples of the second converted vector that were kept to DACs 320. The second KeepM component 790 may be configured to keep and/or discard different quantities of samples to adjust an amount of dispersion compensation and/or an amount of power dissipation of Tx DSP 310, in a similar manner as described elsewhere herein with respect to KeepN component 545.

DACs 320 may convert the received samples from digital form to analog form (e.g., from a digital sample to an analog optical signal), and may provide the analog signals to Rx module 220 via link 230. In some implementations, Tx DSP 310 may include four DACs: one associated with real values for a sample of the X polarization, one associated with imaginary values for the sample of the X polarization, one associated with real values for a sample of the Y polarization, and one associated with imaginary values for the sample of the Y polarization.

The number and arrangement of components shown in FIGS. 7A-7C are provided as an example. In practice, Tx DSP 310 may include additional components, fewer components, different components, or differently arranged components than those shown in FIGS. 7A-7C. Additionally, or alternatively, a set of components of Tx DSP 310 may perform one or more functions described as being performed by another set of components of Tx DSP 310.

Systems and/or methods, described herein, may use more than four sub-carriers, and may compensate for dispersion when more than four sub-carriers are used to transmit optical signals, which may be more computationally efficient than compensating for dispersion when a single carrier is used to transmit optical signals. The systems and/or methods may handle a data rate per optical signal that is greater than the data rates per optical signal handled by existing WDM systems. Thus, the systems and/or methods may provide a composite symbol rate that is greater than the composite symbol rate provided by existing WDM systems.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver, comprising:
a first set of components configured to operate upon a first set of sub-carriers, associated with an optical channel, to compensate for chromatic dispersion and/or polarization mode dispersion that occurs when transmitting an optical signal associated with the optical channel; and
a second set of components configured to operate upon a second set of sub-carriers, associated with the optical channel, to compensate for chromatic dispersion and/or polarization mode dispersion that occurs when transmitting the optical signal associated with the optical channel,
the optical channel including a plurality of sub-carriers,
the plurality of sub-carriers including the first set of sub-carriers and the second set of sub-carriers, and
a quantity of the plurality of sub-carriers being greater than four;
wherein the receiver is configured to:
demodulate the optical channel by frequency shifting the first set of sub-carriers based on the second multiplier, and
demodulate the optical channel by frequency shifting the second set of sub-carriers based on the first multiplier.

2. The optical receiver of claim 1, where the first set of sub-carriers includes four sub-carriers and the second set of sub-carriers includes four sub-carriers.

3. An optical system, comprising:
an optical transmitter configured to modulate an optical signal to carry data, associated with an optical channel, via a plurality of sub-carriers,
a quantity of the plurality of sub-carriers being greater than four; and
an optical receiver configured to demodulate the optical signal to recover the data from the plurality of sub-carriers,
wherein the plurality of sub-carriers includes a first set of sub-carriers and a second set of sub-carriers, different than the first set of sub-carriers:
the optical transmitter is further configured to:
modulate the optical signal, associated with the first set of sub-carriers, by frequency shifting the first set of sub-carriers based on a first multiplier, and
modulate the optical signal, associated with the second set of sub-carriers, by frequency shifting the second set of sub-carriers based on a second multiplier, different than the first multiplier; and
the optical receiver is further configured to:
demodulate the optical signal, associated with the first set of sub-carriers, by frequency shifting the first set of sub-carriers based on the second multiplier, and
demodulate the optical signal, associated with the second set of sub-carriers, by frequency shifting the second set of sub-carriers based on the first multiplier.

4. The optical system of claim 3, where the plurality of sub-carriers includes a first set of sub-carriers and a second set of sub-carriers, different than the first set of sub-carriers, and the optical receiver is further configured to:
operate upon the first set of sub-carriers and the second set of sub-carriers to compensate for chromatic dispersion and/or polarization mode dispersion that occurs when transmitting the optical signal associated with the optical channel.

* * * * *